US009521610B2

(12) United States Patent
Lin et al.

(10) Patent No.: US 9,521,610 B2
(45) Date of Patent: Dec. 13, 2016

(54) METHOD AND APPARATUS FOR SELECTING A SERVICE INSTANCE

(71) Applicant: MOTOROLA SOLUTIONS, INC, Schaumburg, IL (US)

(72) Inventors: Lin Lin, Fox River Grove, IL (US); Anthony R. Metke, Naperville, IL (US); Juana E. Nakfour, Hawthorn Woods, IL (US); Karen M. Suttmann, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 44 days.

(21) Appl. No.: 14/710,800

(22) Filed: May 13, 2015

(65) Prior Publication Data

US 2016/0337956 A1 Nov. 17, 2016

(51) Int. Cl.
  *H04M 3/42* (2006.01)
  *H04W 48/18* (2009.01)
  *H04W 4/02* (2009.01)
  *H04L 29/08* (2006.01)
  *H04W 72/04* (2009.01)
  *H04W 72/08* (2009.01)

(52) U.S. Cl.
  CPC .............. *H04W 48/18* (2013.01); *H04L 67/34* (2013.01); *H04W 4/021* (2013.01); *H04W 72/048* (2013.01); *H04W 72/085* (2013.01)

(58) Field of Classification Search
  CPC ........................... H04W 4/02; H04L 29/08657
  USPC ................................ 455/414.2, 404.1, 404.2
  See application file for complete search history.

(56) References Cited

U.S. PATENT DOCUMENTS

| 6,393,458 | B1 | 5/2002 | Gigliotti et al. |
| 6,853,642 | B1 | 2/2005 | Sitaraman et al. |
| 7,215,677 | B2 | 5/2007 | Lung |
| 7,616,640 | B1 | 11/2009 | Sitaraman et al. |
| 7,752,626 | B1 | 7/2010 | Pandey et al. |
| 7,937,493 | B2 | 5/2011 | Colrain et al. |
| 8,817,625 | B1 | 8/2014 | Zhang et al. |
| 8,838,792 | B2 | 9/2014 | McCarty |
| 2008/0162160 | A1 | 7/2008 | Singh et al. |

(Continued)

OTHER PUBLICATIONS

The International Search Report and The Written Opinion, PCT Serial No. PCT/US2016/031645, Filed : May 10, 2016, mailed: Jul. 19, 2016, all pages.

*Primary Examiner* — Chuck Huynh

(57) ABSTRACT

A method and apparatus are provided that select an instance of a service for use by a mobile device. A list of multiple instances of the service is assembled, wherein each instance of the service of the multiple instances of the service is hosted by a different mobile device of multiple mobile devices. For each of the multiple instances of the service, situational information and environmental information is determined in association with the mobile device hosting the instance, wherein the situational information comprises information associated with an operating condition of a user of the hosting mobile device and wherein the environmental information comprises information associated with environmental conditions in which the hosting mobile device is operating. An instance of the service then is selected from among the multiple instances based on the environmental information and the situational information determined for each of the multiple instances.

20 Claims, 4 Drawing Sheets

(56) References Cited

U.S. PATENT DOCUMENTS

2011/0125736 A1* 5/2011 Dave .................. G06Q 10/10
707/723
2014/0187190 A1* 7/2014 Schuler ................ H04L 63/10
455/404.1
2014/0321444 A1 10/2014 Klein

* cited by examiner

METHOD AND APPARATUS FOR SELECTING A SERVICE INSTANCE

FIELD OF THE INVENTION

The present invention relates generally to wireless networking in a geographic area among a plurality of users, such as users at a public safety incident scene, and in particular to a method and apparatus for selecting a service instance hosted by one or more such users.

BACKGROUND OF THE INVENTION

Conventionally, public safety systems offer centralized services that reside at a central area and are available to public safety users in the field through a wireless Wide Area Network (WWAN) serving a large geographic area such as a city or county. Public safety systems are evolving such that first responders are equipped with mobile devices, in the form of handsets, laptops, etc., that have the capability of wirelessly networking together in a high-speed wireless Local Area Network (WLAN) serving a much smaller geographic area, such as a city block. Exemplary services can include video services via a server, web services via a server, push-to-talk services, location services, etc. Mobile devices are moving to host client/server-based services in the WLAN for the needs of first responders. The benefits of hosting local services on the WLAN are reduced latency connections from those services hosted in the WLAN versus the WWAN, reduced data traffic on the WWAN as the traffic now becomes local to the LAN, and the ability to operate without a connection to the WWAN for some services. Local hosting of services includes one or more service instances being hosted on mobile devices in the WLAN associated with public safety responders.

When a service request is made by a public safety responder at a scene of an incident and backend service is not available or is otherwise not favorable, one of the locally hosted service instances may be selected to service the request. However, circumstances may exist where it would be disadvantageous to select a mobile device of a particular responder currently hosting a requested service instance. Further, such circumstances may dynamically change such that a particular responder may be capable of servicing a service request at one time yet may be disadvantaged by servicing a service request at another time during the incident.

BRIEF DESCRIPTION OF SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
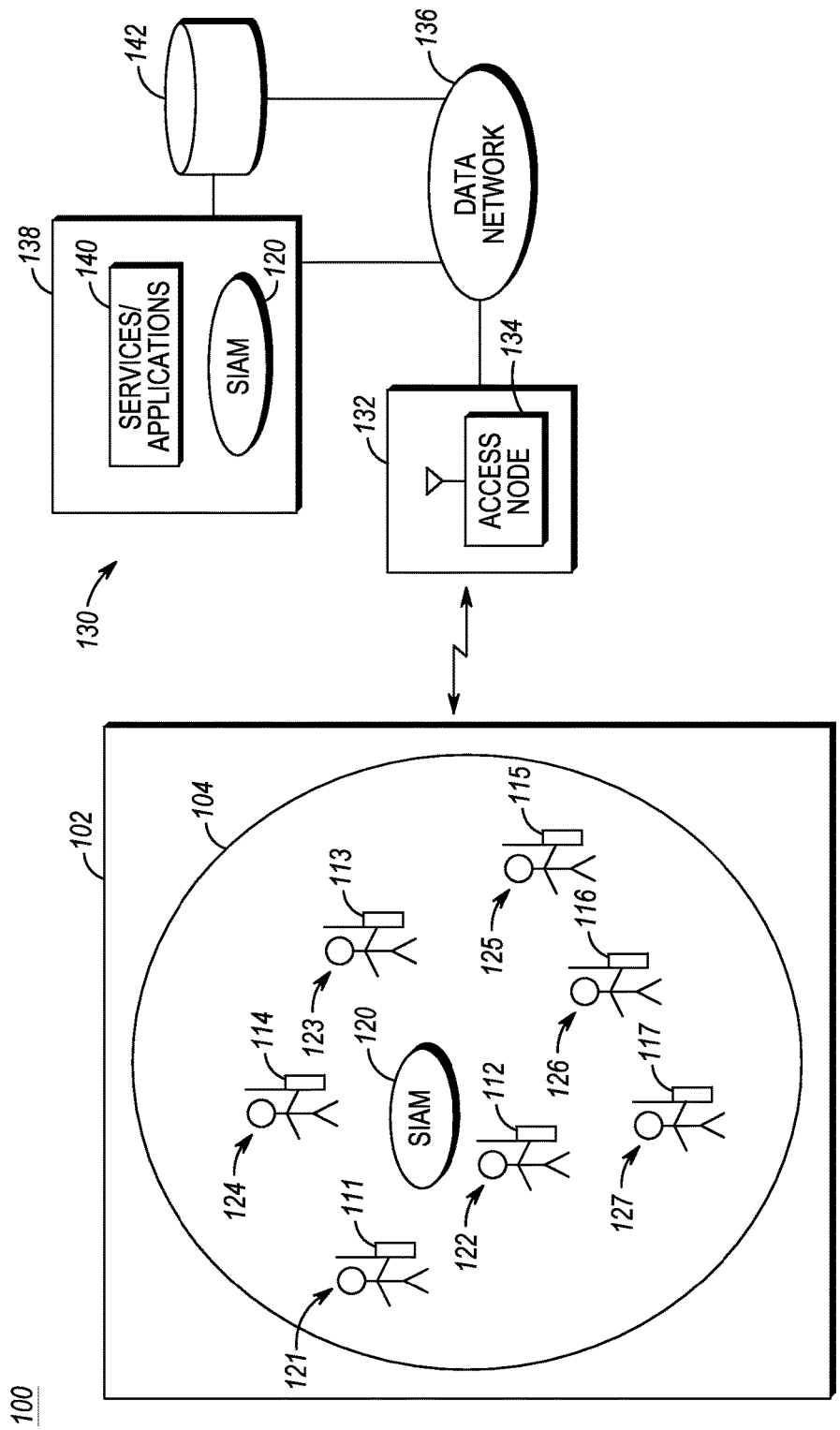
FIG. 1 is a block diagram of a communication system in which service instance selection is implemented in accordance with some embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method and apparatus are provided that select an instance of a service for use by a mobile device. A list of multiple instances of the service is assembled, wherein each instance of the service of the multiple instances of the service is hosted by a different mobile device of multiple mobile devices. For each instance of the service of the multiple instances of the service, situational information is determined in association with the mobile device hosting the instance of the service, wherein the situational information comprises information associated with an operating condition of a user of the hosting mobile device. Further, for each instance of the service of the multiple instances of the service, determining environmental information is determined in association with the mobile device hosting the instance of the service, wherein the environmental information comprises information associated with environmental conditions in which the hosting mobile device is operating. An instance of the service then is selected from among the multiple instances of the service based on the environmental information and the situational information determined for each of the multiple instances of the service.

Generally, an embodiment of the present invention encompasses a method of selecting an instance of a service for use by a mobile device. The method includes assembling a list of multiple instances of a service, wherein each instance of the service of the multiple instances of the service is hosted by a different mobile device of multiple mobile devices. For each instance of the service of the multiple instances of the service, situational information is determined that is associated with the mobile device hosting the instance of the service, wherein the situational information comprises information associated with an operating condition of a user of the mobile device. Further, for each instance of the service of the multiple instances of the service, environmental information is determined that is associated with the mobile device hosting the instance of the service, wherein the environmental information comprises information associated with environmental conditions in which the mobile device is operating. An instance of the service, is selected from among the multiple instances of the service based on the environmental information and the situational information determined for each of the multiple instances of the service.

Another embodiment of the present invention encompasses an apparatus for selecting an instance of a service for use by a mobile device. The apparatus includes a processor and an at least one memory device that is configured to store instructions that, when executed by the processor, cause the processor to implement a service instance assignment manager that is configured to perform the following functions: assemble a list of multiple instances of a service, wherein each instance of the service of the multiple instances of the service is hosted by a different mobile device of multiple mobile devices; for each instance of the service of the multiple instances of the service, determine situational information associated with the mobile device hosting the instance of the service, wherein the situational information comprises information associated with an operating condition of a user of the mobile device; for each instance of the service of the plurality of instances of the service, determine environmental information associated with the mobile device hosting the instance of the service, wherein the environmental information comprises information associated with environmental conditions in which the mobile device is operating; and select an instance of the service from among the multiple instances of the service based on the environmental information and the situational information determined for each of the multiple instances of the service.

The present invention may be more fully described with reference to FIGS. 1-5. FIG. 1 is a block diagram of wireless communication system 100 in accordance with an embodiment of the present invention. Communication system 100 includes multiple mobile devices 111-117 (seven shown), and corresponding responders 121-127, present at an incident scene 102, such as but not limited to a cellular telephone, a land mobile radio (LMR), a personal digital assistant (PDA), laptop computer, or personal computer with radio frequency (RF) capabilities, or any other type of mobile device with wide area network (WAN) and/or wireless local area network (WLAN) capabilities. In various technologies, mobile devices 111-117 may be referred to as mobile stations (MSs), user equipment (UEs), user terminals (UTs), subscriber stations (SSs), subscriber units (SUs), remote units (RUs), access terminals, and so on.

The multiple mobile devices 111-117 may access a network 130 of a local agency, such as a police department or a fire department, via a radio access network (RAN) 132 of the agency. RAN 132 includes one or more wireless access nodes 134 (one shown), such as a Node B, an evolved Node B (eNB), an access point (AP), or base station (BS). RAN 132 also may include one or more access network controllers (not shown), such as a Radio Network Controller (RNC) or a Base Station Controller (BSC), coupled to the one or more wireless access nodes; however, in various embodiments of the present invention, the functionality of such an access network controller may be implemented in the access node. Access node 134 provides wireless services to mobile devices, such as mobile devices 111-117, located in a coverage area of the access node, via any suitable wireless wide area network (WAN) or local area network (LAN) protocol, for example, Long Term Evolution (LTE), cellular/wireless telecommunication protocols (e.g. 3G/4G, etc.), Land Mobile Radio (LMR), Digital Mobile Radio (DMR), Terrestrial Trunked Radio (TETRA), Project 25 (P25), Institute of Electrical and Electronics Engineers (IEEE) 802 protocols, and the like.

While mobile devices 111-117 are depicted in FIG. 1 as being served by a same RAN and access node, in other embodiments of the present invention one or more of mobile devices 111-117 may be served by a different RAN or access node, which different RANs or access nodes may implement the same wireless technology or different wireless technologies. For example, one or more of mobile devices 111-117 may be a narrowband mobile device, such as an LMR, served by a narrowband RAN and others of mobile devices 111-117 may be a broadband mobile device served by a broadband RAN.

Wireless communication system 100 further comprises an Incident Area Network (IAN) 104 that provides wireless communication services to responders 121-127 at incident scene 102. In various embodiments of the present invention, IAN 104 may be a wireless local area network (WLAN) serviced by an access node 134 of a radio access network (RAN) 132 and/or may comprise a mesh network that is established utilizing the mobile devices 111-117 of the responders 121-127, such as handheld devices or vehicular devices. IAN 104 can be operated using any suitable WLAN protocol or mesh network protocol, such as IEEE 802.11 and variants thereof ("Wi-Fi"), Bluetooth, HiperLAN, ZigBee (IEEE 802.15.4), WiMAX (IEEE 802.16e), and the like. IAN 104 enables the responders 121-127 to access applications and services 140 that are provided by one or more servers 138 (one shown), and user profile information provided by a user profile database 142, of a local agency. In various embodiments of the present invention, user profile database 142 may be included in server 138 or may be a network element separate from and accessible by the server. In still other embodiments of the present invention, server 138 and/or user profile database 142 may be a remote server/database operated by the local agency and accessible by the mobile devices 111-117 of the responders 121-127 via access node 134 and a data network 136, or server 138 and/or context database 142 may be co-located with access node 134 in a command VAN present at incident scene 102.

Together, RAN 132, including access node 134, data network 136, server 138, and database 142 may be referred to as a network, or infrastructure, 130 of communication system 100 and correspondingly each of access node 134, data network 136, server 138, and database 142 may be referred to as a network, or infrastructure, element. Network 130 can be any type of communication network, wherein the mobile devices communicate with network elements using any suitable over-the-air protocol and modulation scheme. Although not shown, network 130 may comprise a further number of network elements for a commercial embodiment that are commonly referred to as, but not limited to, bridges, switches, zone controllers, routers, authentication centers, or any other type of infrastructure equipment facilitating communications between entities in a wireless or wired environment. Finally, it should be noted that communication system 100 is illustrated by reference to a limited number of devices for ease of illustration. However, any suitable number of authenticator devices, user devices, networks, and independent services may be implemented in a commercial system without loss of generality of the teachings herein.

For the purpose of illustrating the principles of the present invention, it is assumed that one or more, but fewer than all, of the multiple mobile devices 111-117, for example, mobile devices 111-113, are hosting service instances for IAN 104, which mobile devices also are referred to herein as 'host mobile devices,' that is, a first host mobile device 111, a second host mobile device 112, and a third host mobile device 113. That is, as described herein, instances of services (or applications) that are locally hosted in IAN 104 are hosted by the mobile devices of the IAN. The services (or applications) can include any service or application utilized by the first responders associated with the mobile devices 111-117, such as, for example, video services, web services, push-to-talk (PTT) services, location services, command-and-control services, etc. The services (or applications) also can be hosted centrally in server 138 of the local agency or of a command VAN present at incident scene. Regardless, the methods and apparatuses described herein assume a local hosting of the services in the IAN 104.

IAN 104 may include a service instance assignment manager (SIAM) 120 that performs service instance allocation and assignment functions. That is, SIAM 120 is configured to assign or allocate service instances to the mobile devices 111-117 and to assign a request for a particular service (or application) instance, received from a mobile device of IAN 104, to another mobile device of the IAN that is locally hosting such a service instance. Specifically, SIAM 120 provides a service instance assignment function which determines which of the mobile devices 111-113 currently hosting a specific service instance is selected to service a request for that service instance in IAN 104. SIAM 120 is a logical function that may be operated in a distributed fashion, such as on each of mobile devices 111-117, or in a centralized manner, such as on a mobile device of an incident commander or on server 138.

In the U.S., a national standard, National Incident Management System (NIMS) Incident Command System (ICS), provides a method for an incident commander (IC) to direct incident resources. For example, the ICS has standardized role definitions for each incident type where the IC assigns users to roles to create an incident command and control hierarchy. The IC can have a command mobile device 111-117, for example, a tablet, etc., for the IC to assign resources to tasks (for example, "ladder company 2, proceed to the back of the building for search and rescue"). The ICS is a standard designed to support all incidents and all disciplines (police, fire, EMS, local, state, federal, etc.). Additionally, incident scene 102 has to support limited or no WWAN 136 connectivity. In order to support this type of radio frequency (RF) environment, the method and apparatus described herein uses service instances at incident scene 102, which service instances are hosted on local mobile devices 111-117.

SIAM 120 functionality accounts for the fact that incident scene 102 is dynamic in nature with responders arriving over time (and their associated mobile devices). During the course of the incident, first responders may be assigned and/or unassigned to the incident and may arrive at, and leave, the incident scene. Moreover, as first responders move about incident scene 102, a connection of their mobile devices 111-117 to IAN 104 may change, particularly in an urban environment. Thus, IAN 104 is likely to have mobile devices where the connections between the mobile devices themselves come and go during a lifetime of the incident. By providing multiple replicas of a service instance at incident scene 102, communication system 100 is able to provide high availability (for example, if a police car drives away with a server in the trunk or a responder hosting a service instances loses connectivity with other mobile devices in IAN 104, service can continue at incident scene 102).

Figure 2:
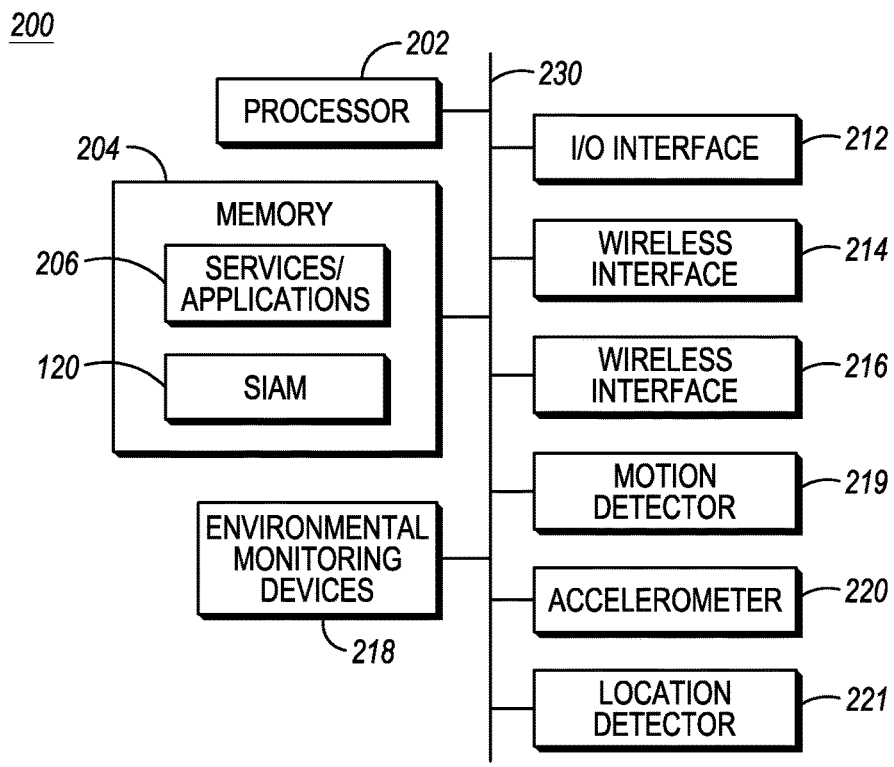
FIG. 2 is a block diagram illustrating a mobile device of the system of FIG. 1 in accordance with some embodiments of the present invention.

Referring now to FIG. 2, a block diagram is provided of a mobile device 200, such as mobile devices 111-117, in accordance with some embodiments of the present invention. Mobile device 200 may be, for example, a smart phone, a land mobile radio (LMR), a vehicle modem, a server mounted in vehicle, a tablet, a laptop, a body-worn computing device, etc. Mobile device 200 generally includes a processor 202, at least one memory device 204, one or more input/output (I/O) interfaces 212, one or more wireless interfaces 214, 216 (two shown), and one or more operating condition monitoring devices 218-221 (four shown). It should be appreciated by those of ordinary skill in the art that FIG. 2 depicts mobile device 200 in an oversimplified manner, and a practical embodiment may include additional components and suitably configured processing logic to support known or conventional operating features that are not described in detail herein. The components (202, 204, 212, 214, 216, and 218-221) of mobile device 200 are communicatively coupled via a local interface 230. Local interface 230 can be, for example but not limited to, one or more buses or other wired or wireless connections, as is known in the art. Local interface 230 can have additional elements, which are omitted for simplicity, such as controllers, buffers (caches), drivers, repeaters, and receivers, among many others, to enable communications. Further, local interface 230 may include address, control, and/or data connections to enable appropriate communications among the aforementioned components.

Mobile device 200 operates under the control of processor 202, such as one or more microprocessors, microcontrollers, digital signal processors (DSPs), combinations thereof or such other devices known to those having ordinary skill in the art. Processor 202 operates the corresponding mobile device according to data and instructions stored in the at least one memory device 204, such as random access memory (RAM), dynamic random access memory (DRAM), and/or read only memory (ROM) or equivalents thereof, that stores data and instructions that may be executed by the corresponding processor so that the mobile device may perform the functions described herein.

I/O interfaces 212 may include user interfaces that allow a user to input information in, and receive information from, mobile device 200. For example, the user interfaces may include a keypad, a touch screen, a scroll ball, a scroll bar, buttons, bar code scanner, and the like. Further, the user interfaces may include a display device such as a liquid crystal display (LCD), touch screen, and the like for displaying system output. I/O interfaces 212 also can include, for example, a serial port, a parallel port, a small computer system interface (SCSI), an infrared (IR) interface, a universal serial bus (USB) interface, and the like for communicating with, or coupling to, an external device. Additionally, I/O interfaces 212 may include an imaging device such as a camera or a video camera.

The one or more wireless interfaces 214, 216 (two shown) facilitate an exchange wireless communications with other mobile devices and/or with RAN 132. For example, the one or more wireless interfaces 214, 216 may include a first, short-range wireless interface 214 for short-range communications, such as a Bluetooth apparatus that includes a respective Bluetooth radio and antenna and/or a WLAN apparatus that includes an WLAN transceiver and antenna.

Further, the one or more wireless interfaces 214, 216 may include a second, longer range wireless interface 216, such as a wireless area network (WAN) radio transceiver with a corresponding antenna.

The instructions maintained by at least one memory device 204 include software programs that include an ordered listing of executable instructions for implementing logical functions. For example, the software in at least one memory device 204 includes a suitable operating system (O/S) and programs. The operating system essentially controls the execution of other computer programs, and provides scheduling, input-output control, file and data management, memory management, and communication control and related services. The programs may include various applications, add-ons, etc. configured to provide user functionality with mobile device 200. For example, the programs can include the various services instances 206 described herein as well as SIAM 120 functionality. Again, the service instances can include PTT, video, web, location tracking, command and control, etc. The execution of SIAM 120 by processor 202 allows mobile device 200 to perform an incident-based assignment of service instances. Further, at least one memory device 204 maintains one or more mobile device identifiers, such as a mobile station identifier (MS ID), a subscriber unit identifier (SU ID), an International Mobile Subscriber Identity (IMSI), or a Temporary Mobile Subscriber Identity (TMSI), that uniquely identifies the mobile device in communication system 100.

The one or more operating condition monitoring devices 218-221 include sensors and detectors that provide environmental and situational information concerning operating conditions of mobile device 200, and correspondingly a user of the mobile device. For example, the one or more monitoring devices 218-221 may include one or more environmental monitoring devices 218 that provide information regarding a surrounding physical environment, such as a smoke detector that detects a level of smoke in the operating environment of the mobile device, a light detector that detects an level of ambient light in the operating environment of the mobile device, and a sound detector that detects an level of ambient sound in the operating environment of the mobile device. By way of another example, the one or more operating condition monitoring devices 218-221 may additionally, or instead, include a motion detector 219 that detects whether the mobile device, and correspondingly a user of the mobile device, is in motion or stopped, an accelerometer 220 that detects an orientation of the mobile device (and correspondingly the user), such as whether the mobile device/user is in a prone or upright position, and/or a location detector 221 by which mobile device 200 may determine its geographical location. Further, processor 202 of mobile device 200 may communicate, via wireless interface 214, with a gun tracking sensor of a gun associated with a user of the mobile device, such as a smart gun as known in the art, which gun tracking sensor detects whether the gun has been removed from its holster or has been fired.

Location detector 221 may comprise, for example, a GPS receiver and/or may comprise circuitry, for example, one or more antennas and a microprocessor, such as being implemented by processor 202, by which mobile device 200 may receive signals from multiple base stations and determine its location based on the received signals, such as based on a time differences of arrival (TDOA) among such signals and/or triangulation. In still other exemplary embodiments of location detector 221, mobile device 200 may transmit a signal to each of multiple base stations, which may in turn determine a location of the mobile device based on time differences of arrival (TDOA) among the signals received at each such base station and/or triangulation and then one or more of the base stations may transmit the determined location back to the mobile device. Based on the signals received from the one or more base stations, location detector 221 then determines the location of the mobile device.

Figure 3:
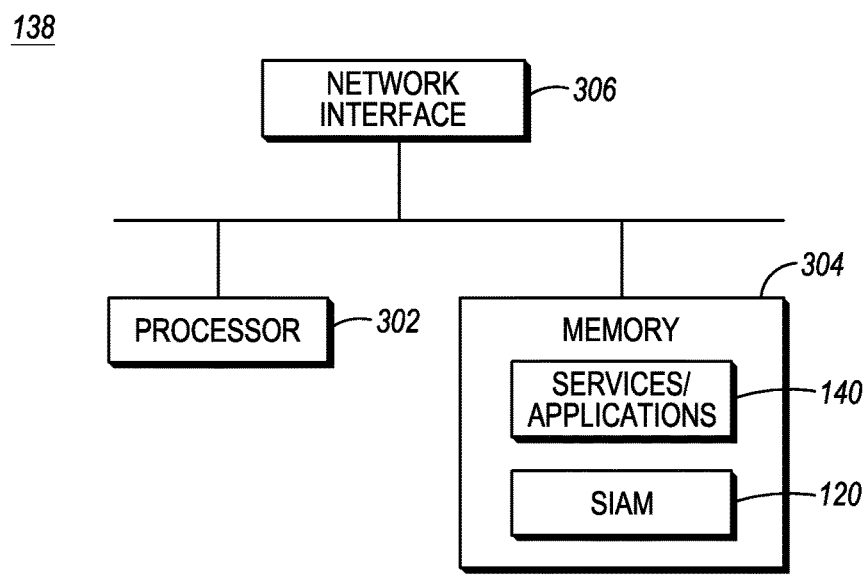
FIG. 3 is a block diagram of a server of the communication system of FIG. 1 in accordance with some embodiments of the present invention.

Referring now to FIG. 3, a block diagram is provided of server 138 in accordance with some embodiments of the present invention. Server 138 operates under the control of a processor 302 such as one or more microprocessors, microcontrollers, digital signal processors (DSPs), combinations thereof or such other devices known to those having ordinary skill in the art. Processor 302 operates the server according to data and instructions stored in an at least one memory device 304, such as random access memory (RAM), dynamic random access memory (DRAM), and/or read only memory (ROM) or equivalents thereof, that stores data and programs that may be executed by the corresponding processor so that the server may perform the functions described herein. The at least one memory device 304 of server 138 further includes programs and instructions that, when executed by processor 302, implement one or more applications or services 140, for example, the various service instances 206 described herein as well as SIAM 120 functionality.

Server 138 further includes one or more network interfaces 306 for connecting to data network 136 and, via the data network, to other devices of communication system 100, such as user profile database 142 and mobile devices 111-117. The one or more network interfaces 306 may include a wireless, a wireline, and/or an optical interface that is capable of conveying messaging, such as data packets, to, and receiving messaging from, data network 136.

Unless otherwise specified herein, the functionality described herein as being performed by a mobile device, such as mobile devices 111-117, and by a server, such as server 138, is implemented with or in software programs and instructions stored in the respective at least one memory device 204, 304 of the mobile device and server and executed by the associated processor 202, 302 of the mobile device and server.

Figure 4:
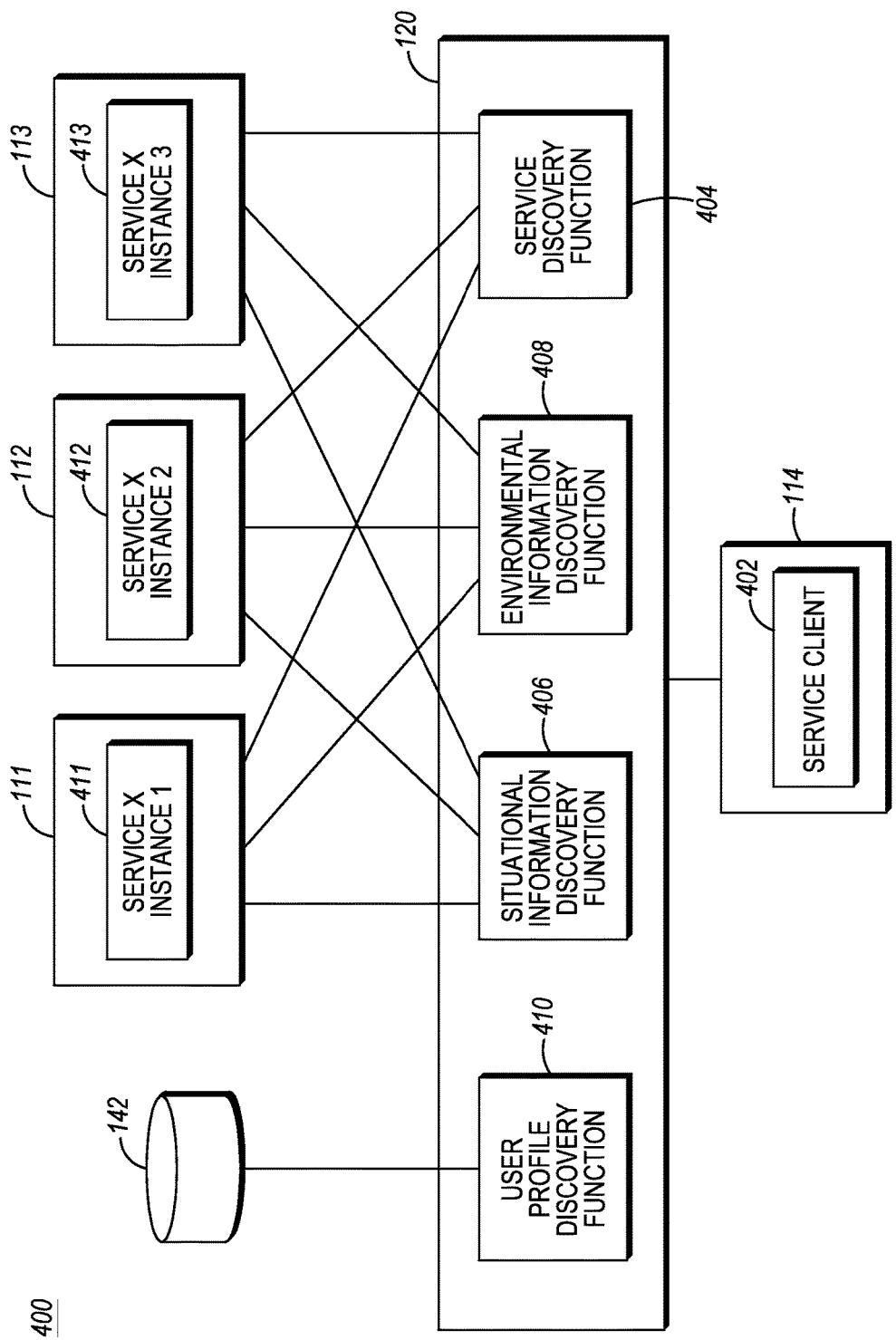
FIG. 4 is a functional block diagram of the communication system of FIG. 1 in accordance with some embodiments of the present invention.

The teachings herein are directed to methods for selecting a service instance of one of mobile devices 111-117 for use by another of mobile devices 111-117. For example, and referring now to FIG. 4, a functional block diagram of communication system 100 is provided in accordance with some embodiments of the present invention, wherein a service client 402 operating on a mobile device, such as mobile device 114, seeks to use an instance of a particular service or application (collectively referred to herein as a 'service'), depicted in FIG. 4 as service 'X.' Further, as depicted in FIG. 4, an instance of service 'X' is available at each of mobile devices 111-113, that is, a first instance of service X (service instance 411) at mobile device 111, a second instance of service X (service instance 412) at mobile device 112, and a third instance of service X (service instance 413) at mobile device 113. In order to determine which of service instances 411-413 is to be used by mobile device 114, SIAM 120 implements a service discovery function 404 that discovers the available service instances 411-413, an environmental information discovery function 408 that discovers (that is, retrieves from a corresponding mobile device) environmental information, that is, information concerning the physical environment in which each service instance 411-413, and more particular the corresponding mobile device 111-113 associated with the service instance, is operating, and a situational information discovery function 406 that discovers (that is, retrieves from a corresponding mobile device) situational information, that is, information concerning an operating situation of a user 121-123 associated with the corresponding mobile device 111-113 and service instance 411-413. However, in other embodiments of the present invention, environmental information discovery function 408 and situational information discovery function 406 additionally, or instead, may discover, that is, retrieve, environmental information and situational information associated with a given service instance from sources other than the mobile device hosting the service instance. For example, environmental information discovery function 408 may discover environmental information from geographically-dispersed environmental monitoring stations as known in the art, whose locations are pre-determined and are known to environmental information discovery function 408 or are included in information provided by such monitoring devices. In such an embodiment, based on a determined location of a mobile device and the locations of the geographically-dispersed environmental monitoring devices, environmental information discovery function 408 may associate a mobile device with environmental information retrieved from an environmental monitoring device nearest to the mobile device. By way of other examples, situational information discovery function 406 may discover situational information from any of many known social media platforms, such as Twitter comments or Instant Messaging messages of other responders, which comments/messages may inform that a user of a mobile device hosting a given service instance is, for example, under fire, shot, or otherwise indisposed, or from an agency dispatcher who may provide information concerning a current operating situation of a user of a mobile device hosting a given service instance. By way of yet other examples, environmental information discovery function 408 and situational information discovery function 406 may discover environmental information and situational information associated with a given service instance and associated user/mobile device from back-end servers, such as public safety agency servers, that collect such information, or directly from mobile devices, such as any of mobile devices 111-117, of other users proximate to the user/mobile device associated with the given service instance.

Further, SIAM 120 may include a user profile discovery function 410 that communicates with user profile database 142 and discovers information concerning a profile of the user 121-123 associated with the corresponding mobile device 111-113 and service instance 411-413, for example, a role of the user, for example, a fireman, a policeman, or a hazardous material ('hazmat') responder, and/or a rank of the user, for example, captain, commander, shift leader, battalion chief, detective, and so on. Based on one or more of the environmental information, the situational information, and the profile of the user associated with each available service instance 111-113, SIAM 120 then selects one of service instances 111-113 for use by mobile device 114.

Figure 5:
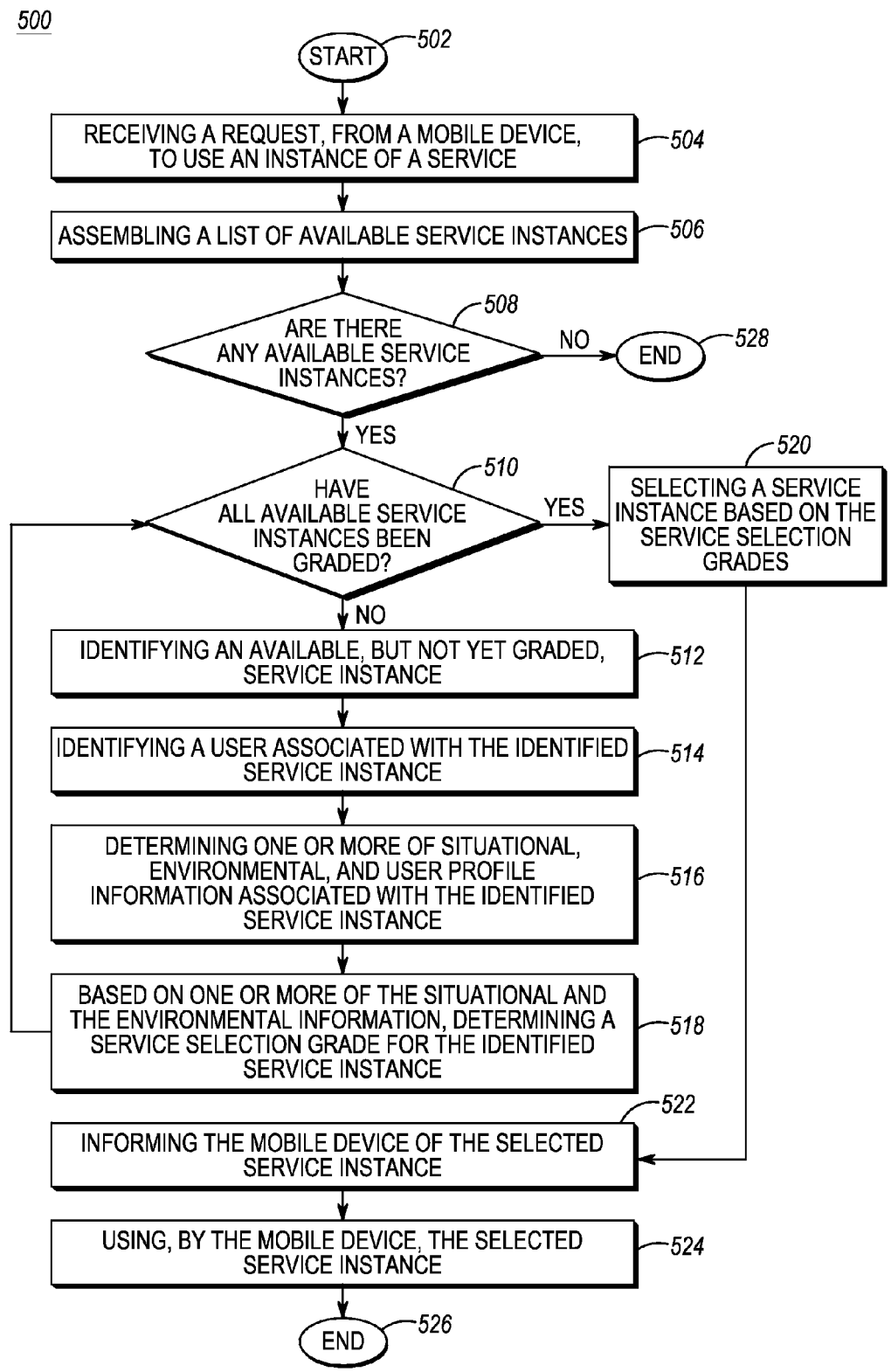
FIG. 5 is a logic flow diagram illustrating a method performed by the communication system of FIG. 1 in selecting a service instance in accordance with some embodiments of the present invention.

Referring now to FIG. 5, a logic flow diagram 500 is provided that illustrates a method performed by communication system 100 in performing service instance selection accordance with some embodiments of the present invention. Logic flow diagram 500 begins (502) when SIAM 120 receives (504) a request to use an instance of a service by a requesting mobile device, such as mobile device 114, or a corresponding user, that is, user 124, wherein the mobile device does not currently maintain an instance of the service. For example, user 124 of mobile device 114 may input an instruction, via a user interface of I/O interfaces 212 of the mobile device, to use an instance of the service or to activate an instance of the service. By way of another example, mobile device 114 may receive a request to engage in a communication session involving the service and, in response to receiving the request, automatically determine to obtain use of an instance of the service. In response to receiving the instruction from user 124 and/or receiving the request to engage in the communication session, mobile device 114 activates a service client 402 which requests that SIAM 120 provide an instance of the service for use by the mobile device.

In various embodiments of the present invention, SIAM 120 may be implemented by the mobile device requesting the service instance, that is, mobile device 114, or may be implemented in a centralized manner, such as on a mobile device of an incident commander, for example, mobile device 118, or on server 138. When SIAM 120 is implemented on requesting mobile device 114, service client 402 may request an assignment of an instance of the service (that is, a service instance) to the mobile device by activating service discovery function 404 and identifying the requested service to the service discovery function. When SIAM 120 is implemented elsewhere, such as on mobile device 118 or on server 138, service client 402 may convey, to SIAM 120, a request that the SIAM assign an instance of the service to the service client 402/mobile device 114, which request both identifies mobile device 114, for example, by including a mobile device identifier associated with mobile device 114, and identifies the requested service.

In response to receiving the request to assign the service instance to mobile device 114, SIAM 120, and more particularly service discovery function 404, assembles (504) a list of available instances of the service, such as service instances 411-413, and corresponding mobile devices, that is, mobile devices 111-113, associated with the available service instances.

In one embodiment, service discovery function 404 may discover the available service instances 411-413 and corresponding mobile devices 111-113 from a service registry. That is, each mobile device 111-113 maintaining an instance of the requested service and/or activating an instance of the requested service may register the service instance with a service registry, for example, maintained by server 138, by identifying itself and the service instance to the service registry. Thus the service registry, that is, server 138, maintains a list of available service instances and associated mobile devices maintaining and/or executing such service instances. In response to a request by mobile device 114 to use an instance of the service, SIAM 120, and in particular service discovery function 404, may query the service registry for a list of available service instances. In response to the query, the service registry may return, to service discovery function 404, a list of mobile devices, such as mobile devices 111-113, maintaining and/or running such service instances.

In another embodiment, wherein service discovery function 404 is implemented by requesting mobile device 114, the service discovery function may convey a service discovery query over IAN 104, for example, via a broadcast. The service discovery query requests that mobile devices maintaining and/or running an instance of the service identify themselves to mobile device 114. In response to receiving the query, each mobile device maintaining and/or running an instance of the service, that is, mobile devices 111-113, then identifies itself to service discovery function 404 of mobile device 114.

In yet another embodiment, wherein service discovery function 404 is implemented by requesting mobile device 114, when each mobile device maintaining an instance of the service, such as mobile device 111-113, joins IAN 104 or activates a service instance in IAN 104, the mobile device may advertise, to the other mobile devices that are part of the IAN, such as mobile device 114, service instances maintained by, and/or activated by, the mobile device. Each mobile device receiving the advertisement, such as mobile device 114, then may store, in its at least one memory device 204, an identifier of the advertising mobile device, that is, mobile devices 111-113, in association with the advertised service instance. When service client 402 of mobile device 114 queries SIAM 120, and in particular service discovery function 404, for a list of available service instances, the service discovery function may assemble a list of mobile devices maintaining and/or running such service instances based on the advertisements received from the other mobile devices of the IAN.

In assembling the list of available instances of the service, if SIAM 120 determines (508) that there are no available instances of the service, then logic flow diagram 500 ends (526). However, if SIAM 120 determines (508) that there are one or more available instances of the service, SIAM 120 assigns (510-518) a service selection grade to, and/or updates a service selection grade associated with, each of the available service instances, that is, service instances 411-413, based on situational and environmental information associated with the service instance and selects (520) a service instance 411-413 for use by mobile device 114 based on the assigned/updated service selection grades.

More particularly, if SIAM 120 determines (508) that there are one or more available instances of the service, SIAM 120 identifies (510, 512), based on the list of available instances of the service, a first, available service instance, for example, service instance 411, that has not yet been assigned a service selection grade, or whose service selection grade has not yet been updated within a predetermined period of time, for example, since SIAM 120 received the service instance use request from mobile device 114 or within a specified time prior to receipt of the service instance use request. SIAM 120 further identifies (514) a user, that is, user 121, and a mobile device, that is, mobile device 111, associated with, that is, hosting, the service instance, that is, service instance 411. SIAM 120 then determines (516) one or more of situational, environmental, and user profile information associated with the service instance, that is, service instance 411, the mobile device, that is, mobile device 111, and the user, that is, user 121, and determines (518) a first service selection grade for the first service instance 411 based on the determined situational and environmental information, to produce an updated first service selection grade. For example, when the first service instance has not yet been graded, SIAM 120 may assign a default grade to the service instance and then adjust the default grade based on the determined situational, environmental, and user profile information to produce the updated service selection grade.

In one embodiment of the present invention, determining (518) a service selection grade for, or updating a service selection grade associated with, the service instance based on the determined situational, environmental, and user profile information may involve the following. Based on the determined situational information, SIAM 120 may determine whether user 121 is available for a use of service instance 411 of mobile device 111. For example, for each situational information parameter that indicates an unfavorable situation for using service instance 411, SIAM 120 may downgrade or decrease a situational information grade associated with service instance 411, or may decrease a default situational information grade for service instance 411. On the other hand, for each situational information parameter that indicates a favorable situation for using service instance 411, SIAM 120 may upgrade or increase a situational information grade associated with service instance 411, or may increase a default situational information grade for service instance 411.

SIAM 120 then may compare the situational information grade to a situational information grade threshold maintained by an at least one memory device of the element of communication system 100 implementing SIAM 120, such as a mobile device 111-117 or server 138. If the situational information grade, after consideration of all obtained situational information, is lower than the situational information grade threshold, then user 121 and mobile device 111 may be determined to be unavailable for a use of hosted service instance 411. On the other hand, if the situational information grade exceeds the situational information grade threshold, user 121 and mobile device 111 may be determined to be available for a use of hosted service instance 411, subject to a determination of an environmental information grade.

For example and as described above, mobile device 111 includes one or more operating condition monitoring devices 218-221, such as sensors and detectors, that collect situational and environmental information. The situational information comprises situational information parameters that concern an operating condition of the user of the mobile device, and the environmental information comprises environmental information parameters that concern physical, environment conditions in which the user/mobile device is operating. SIAM 120 then determines situational and environmental information for mobile device 111 by querying mobile device 111 for the situational and environmental information detected by the mobile device, and in response to the query receiving such situational and environmental information from the mobile device. In other embodiments, as noted above, SIAM 120 may additionally, or instead, determine situational and environmental information for mobile device 111 by retrieving such information from sources other than the mobile device itself, for example, from geographically-dispersed environmental monitoring stations, from social media platforms, from an agency dispatcher, from back-end servers, or from other users/mobile devices proximate to mobile device 111, such as any of mobile devices 112-117.

For example, one situational information parameter may be an indication of whether user 121 of mobile device 111 is in a prone or upright position, as determined by accelerometer 220 of mobile device 111. A prone position may indicate that the user is engaged in surveillance or is otherwise occupied, for example, engaged in a physical confrontation, and that using a service instance of the user's mobile device may be unfavorable, resulting in a downward adjustment (for example, a decrease) of the situational information grade. On the other hand, when accelerometer 220 of mobile device 111 indicates that user 121 is in an upright position, then using a service instance of the user's mobile device may be favorable, resulting in an upward adjustment (for example, an increase) of the situational information grade.

By way of another example, another situational information parameter may be an indication of a motion of mobile device 111. For example, motion detector 219 of mobile device 111 may indicate, or processor 202 may be able to determine using location detector 221, whether user 121 is moving or is still (that is, not moving) and/or a speed that the user is moving at, as information as to whether user is engaged in a foot or car chase, in which event using a service instance of the user's mobile device may be unfavorable, resulting in a downward adjustment of the situational information grade. On the other hand, when motion detector 219/location detector 221 indicates that user 121 is still or nearly still (moving at a pace that is slower than a run), then using a service instance of the user's mobile device may be favorable, resulting in an upward adjustment of the situational information grade. By way of yet another example, another situational information parameter may be an indication of whether a gun of user 121 is holstered and/or has been fired. For example, processor 202 may be able to determine, via a gun tracking sensor of the user's smart gun, whether a gun of user 121 is holstered and/or has been fired. An indication that the user's gun has been drawn and/or fired may indicate that using a service instance of the user's mobile device would be unfavorable, resulting in a downward adjustment of the situational information grade. On the other hand, an indication that the user's gun is holstered may indicate that using a service instance of the user's mobile device may be favorable, resulting in an upward adjustment of the situational information grade. In response to a query for situational information by SIAM 120, mobile device 111 may convey, to SIAM 120, situational information collected by the mobile device's operating condition monitoring devices 218-221, for example, the mobile device's accelerometer, motion detector, location detector, and gun tracking sensor.

If the situational information grade determined for user 121 and mobile device 111 indicates an availability of service instance 411 for use by mobile device 114, SIAM 120 may assign a grade to, or updating a grade associated with, environmental information associated with service instance 411. However, in other embodiments of the present invention, SIAM 120 may first assign a grade to, or update a grade associated with, environmental information associated with service instance 411 and then assign a grade to, or update a grade associated with, situational information associated with the service instance. In still other embodiments of the present invention, SIAM 120 may concurrently assign grades to, or update grades associated with, situational and environmental information associated with service instance 411. The order in which situational information grades and environmental information grades are determined is not critical to the present invention.

As noted above, the environmental information comprises environmental information parameters that concern physical, environment conditions in which the user/mobile device is operating. With respect to the assigning of a grade to, or updating a grade associated with, environmental information, similar to the grading of the situational information parameter, for each environmental information parameter that indicates an unfavorable environment for using service instance 411, SIAM 120 may downgrade or lower an environmental information grade associated with service instance 411, or may reduce a default environmental information grade that is to be assigned to service instance 411. On the other hand, for each environmental information parameter that indicates a favorable environment for using service instance 411, SIAM 120 may upgrade or increase an environmental information grade associated with service instance 411, or may increase a default environmental information grade that is to be assigned to service instance 411.

For example, one environmental information parameter may be an ambient sound level of an environment of the mobile device. For example, a sound detector of mobile device 111 may indicate that the mobile device is in a quiet environment, which may indicate that user 121 of mobile device 111 is engaged in surveillance and that using a service instance of the user's mobile device may be unfavorable, resulting in a downward adjustment of the environmental information grade, whereas a noisier environment would indicate that using a service instance of the user's mobile device is favorable, resulting in an upward adjustment of the environmental information grade. On the other hand, an indication that mobile device 111 is in loud environment may indicate that user 121 may be currently engaged in a confrontational situation and that using a service instance of user 121's mobile device 111 may be unfavorable, resulting in a downward adjustment of the environmental information grade, whereas a quieter environment would indicate that using a service instance of the user's mobile device is favorable, resulting in an upward adjustment of the environmental information grade. Thus, an interpretation of whether a sound level indicates that is using a service instance from the mobile device is unfavorable or favorable may depend on a role of the user of the mobile device, as determined from information obtained from user profile database 142, and the incident being responded to.

Another environmental information parameter may be an indication of an ambient smoke level of an environment of the mobile device. For example, a smoke detector of mobile device 111 may detect a level of smoke that indicates that user 121 is currently engaged in battling a fire and that using a service instance of user 121's mobile device 111 may be unfavorable, resulting in a downward adjustment of the environmental information grade. On the other hand, a less smoke-filled environment may indicate that using a service instance of mobile device 111 is favorable, resulting in a upward adjustment of the environmental information grade. Still another environmental information parameter may be an indication of a level of ambient light in an environment of the mobile device. For example, depending upon the time of day, a light detector of mobile device 111 may detect a level of ambient light that indicates that the user is indoors and may be engaged in surveillance such that using a service instance of user 121's mobile device 111 may be unfavorable, resulting in a downward adjustment of the environmental information grade. On the other hand, a more light-filled environment may indicate that using a service instance of the mobile device is favorable resulting in a upward adjustment of the environmental information grade. Yet another environmental information parameter may be a proximity of the user to a hazardous or dangerous situation. For example, by reference to location detector 221 and server 138, SIAM 120 may determine that user 121/mobile device 111 is proximate to an explosion or to a hazardous chemical leak and that using a service instance of user 121's mobile device 111 may be unfavorable, resulting in a downward adjustment of the environmental information grade, especially if the user's profile in user profile database 142 indicates that the user is not a hazardous material (hazmat') responder. In response to a query for environmental information by SIAM 120, mobile device 111 may convey, to SIAM 120, environmental information collected by the mobile device's operating condition monitoring devices 218-221, for example, the mobile device's sound detector, smoke detector, light detector, and location detector.

SIAM 120 then may compare the environmental information grade to an environmental information grade threshold maintained by an at least one memory device of the element of communication system 100 implementing SIAM 120, such as a mobile device 111-117 or server 138. If the environmental information grade, after consideration of all obtained environmental information, is lower than the environmental information grade threshold, then user 121 and mobile device 111 may be determined to be unavailable for a use of hosted service instance 411. On the other hand, if the environmental information grade exceeds the environmental information grade threshold, user 121 and mobile device 111 may be determined to be available for a use of hosted service instance 411, subject to the determination of the situational information grade as described above.

Based on the determined situational and environmental information grades for service instance 411 (and assuming that the service instance is determined to be available, or at least is not determined to be unavailable), SIAM 120 determines (518) a service selection grade for service instance 411. Any of many possible algorithms that may occur to one of ordinary skill in the art may be used to determine the service selection grade based on the determined situational and environmental information grades. For example, in one embodiment of the present invention, the situational information grade and the environmental information grade may be combined, for example, added together, to produce the service selection grade. In one such embodiment, the situational information grade and the environmental information grade may be combined after each is separately determined. In another such embodiment, the grade determined for one, for example, a situational information grade, may be adjusted when determining the other, that is, an environmental information grade (or vice versa, that is, a determined environmental information grade may be adjusted when determining a situational information grade). That is, the situational information grade may be determined first, and then rather than determining a separate environmental information grade, the situational information grade may be adjusted based on the determination of each environmental information parameter. The service selection grade then may be the final, adjusted situational information grade.

In another embodiment of the present invention, weights may be applied to one or both of the situational information grade and the environmental information grade to produce a weighted situational information grade and/or a weighted environmental information grade. The situational and environmental information grades, with the appropriate weighting, then may be combined to produce the service selection grade. In yet another embodiment of the present invention, the service selection grade may merely be the determined situational information grade or the determined environmental information grade, subject to the other information grade indicating that the service instance is available for use by mobile device 114.

After determining, at step 518, whether service instance 411 is available for use by mobile device 114 and determining a service selection grade for service instance 411/mobile device 111/user 121, logic flow diagram 500 then returns to step 510. At step 510, SIAM 120 determines whether there is another available instance of the service that has not yet been assigned a grade or whose grade has not been updated during the predetermined time period. If there is available instance of the service that has not yet been assigned a service selection grade or whose service selection grade has not yet been updated, SIAM 120 identifies (512) such a service instance, that is, a second available service instance, such as service instance 412, and further identifies (514) a user, that is, user 122, and a mobile device, that is, mobile device 112, associated with the service instance. SIAM 120 then obtains (516) one or more of situational, environmental, and user profile information associated with the second service instance, that is, service instance 412, and associated mobile device 112 and user 122, and determines (518) a second service selection grade for the second service instance, and an availability of the second service instance 412 for use by mobile device 114, based on the obtained situational, environmental, and user profile information, to produce a second updated service selection grade for second service instance 412, in the same manner as described above with respect to first service instance 411.

After SIAM 120 determines (518) a second service selection grade for second service instance 412, logic flow diagram 500 again returns to step 510, where SIAM 120 determines whether there is yet another available instance of the service that has not yet been assigned a grade or whose grade has not yet been updated since receiving the service instance use request from mobile device 114. If there is yet another available instance of the service that has not yet been assigned a service selection grade or whose service selection grade has not yet been updated, such as third service instance 413, SIAM 120 repeats steps 514-518 with respect to the third service instance and, in response to determining a third service selection grade for the third service instance and an availability of the third service instance for use by mobile device 114, repeats the cycle of steps 510-518 until all available instances of the service have been graded or their grades updated.

After SIAM 120 determines, at step 510, that all available instances of the service have been graded or their grades updated, SIAM 120 selects (520) one of the graded service instances, such as one of service instances 411-413, for use by mobile device 114 based on the assigned/updated service selection grades. For example, SIAM 120 may select a service instance with a highest service selection grade, or may select any service instance that is determined, based on the situational and environmental information grades, to be available for use.

In response to selecting a service instance for use by mobile device 114, SIAM 120 informs (522) service client 402 of the requesting mobile device, that is, mobile device 114, of the selected service instance and the associated host mobile device, such as service instance 411 and mobile device 111. Mobile device 114 then uses (524), for example, downloads a copy of or otherwise accesses, the selected service instance, that is, service instance 411, from the mobile device hosting the selected service instance, that is, mobile device 111. For example, mobile device 114 may convey, to mobile device 111, a request to download a copy of the service instance and, in response, mobile device 111 conveys a copy of the service instance to mobile device 114 and/or allows mobile device 114 access to service instance 411. Logic flow diagram 500 then ends (526).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of selecting an instance of a service for use by a mobile device, the method comprising:
    assembling a list of a plurality of instances of a service, wherein each instance of the service of the plurality of instances of the service is hosted by a different mobile device of a plurality of mobile devices;
    for each instance of the service of the plurality of instances of the service, determining situational information associated with the mobile device hosting the instance of the service, wherein the situational information comprises information associated with an operating condition of a user of the mobile device, the operating condition taken from the group consisting of motion of the mobile device, orientation of the mobile device, a geographical location of the mobile device, if the user has drawn a gun, if a user is involved in a chase, and if a user is involved in surveillance;
    for each instance of the service of the plurality of instances of the service, determining environmental information associated with the mobile device hosting the instance of the service, wherein the environmental information comprises information associated with environmental conditions in which the mobile device is operating, the environmental conditions taken from the group consisting of a level of smoke in the operating environment of the mobile device, a level of ambient light in the operating environment of the mobile device, and a level of sound in the operating environment of the mobile device; and
    selecting an instance of the service from among the plurality of instances of the service based on the environmental information and the situational information determined for each of the plurality of instances of the service.

2. The method of claim 1, wherein determining situational information comprises determining a situational information grade, wherein the situational information grade is compared to a situational information grade threshold to determine whether or not the mobile device is able to host the service.

3. The method of claim 2, further comprising:
    determining whether a service instance is available for use based on the situational information grade.

4. The method of claim 1, wherein determining environmental information comprises determining an environmental information grade; wherein the environmental information grade is compared to a environmental information grade threshold to determine whether or not the mobile device is able to host the service.

5. The method of claim 4, further comprising:
   determining whether a service instance is available for use based on the environmental information grade.

6. The method of claim 1, wherein selecting an instance of the service from among the plurality of instances of the service comprises:
   for each instance of the service of the plurality of instances of the service, determining a service selection grade based on the environmental information and the situational information associated with the mobile device hosting the instance of the service; and
   selecting an instance of the service based on the service selection grades determined for each instance of the service of the plurality of instances of the service.

7. The method of claim 6, wherein selecting an instance of the service based on the service selection grades comprises selecting an instance of the service having a highest service selection grade.

8. The method of claim 6, wherein determining a service selection grade for each instance of the service comprises:
   determining an environmental information grade for the instance of the service based on the environmental information associated with the mobile device hosting the instance of the service;
   determining a situational information grade for the instance of the service based on the situational information associated with the mobile device hosting the instance of the service, wherein the situational information grade is compared to a threshold to determine whether or not the mobile device is able to host the service; and
   determining a service selection grade for the instance of the service based on the environmental information grade and the situational information grade.

9. The method of claim 8, wherein determining the environmental information grade for the instance of the service comprises adjusting the environmental information grade based on an environmental information parameter and wherein determining the situational information grade for the instance of the service comprises adjusting the situational information grade based on a situational information parameter.

10. The method of claim 8, further comprising, for one or more instances of the service of the plurality of instances of the service:
    performing one or more of:
       comparing the environmental information grade for the instance of the service to an environmental information grade threshold;
       comparing the situational information grade for the instance of the service to a situational information grade threshold; and
    based on the comparison of the environmental information grade to the environmental information grade threshold or the situational information grade to the situational information grade threshold, determining that the instance of the service is unavailable for use by the mobile device.

11. An apparatus for selecting an instance of a service for download to a mobile device, the apparatus comprising:
    a processor;
    an at least one memory device that is configured to store instructions that, when executed by the processor, cause the processor to implement a service instance assignment manager that is configured to perform the following functions:
    assemble a list of a plurality of instances of a service, wherein each instance of the service of the plurality of instances of the service is hosted by a different mobile device of a plurality of mobile devices;
    for each instance of the service of the plurality of instances of the service, determine situational information associated with the mobile device hosting the instance of the service, wherein the situational information comprises information associated with an operating condition of a user of the mobile device, the operating condition taken from the group consisting of motion of the mobile device, orientation of the mobile device, a geographical location of the mobile device, if the user has drawn a gun, if a user is involved in a chase, and if a user is involved in surveillance;
    for each instance of the service of the plurality of instances of the service, determine environmental information associated with the mobile device hosting the instance of the service, wherein the environmental information comprises information associated with environmental conditions in which the mobile device is operating, the environmental conditions taken from the group consisting of a level of smoke in the operating environment of the mobile device, a level of ambient light in the operating environment of the mobile device, and a level of sound in the operating environment a the mobile device; and
    select an instance of the service from among the plurality of instances of the service based on the environmental information and the situational information determined for each of the plurality of instances of the service.

12. The apparatus of claim 11, wherein the service instance assignment manager is configured to determine situational information by determining a situational information grade and to determine whether a service instance is available for use based on the situational information grade, wherein the situational information grade is compared to a situational information grade threshold to determine whether or not the mobile device is able to host the service.

13. The apparatus of claim 11, wherein the service instance assignment manager is configured to determine environmental information by determining an environmental information grade and to determine whether a service instance is available for use based on the environmental information grade.

14. The apparatus of claim 11, wherein the service instance assignment manager further is configured to select an instance of the service from among the plurality of instances of the service by:
    for each instance of the service of the plurality of instances of the service, determining a service selection grade based on the environmental information and the situational information associated with the mobile device hosting the instance of the service; and
    selecting an instance of the service based on the service selection grades determined for each instance of the service of the plurality of instances of the service.

15. The apparatus of claim 14, wherein the service instance assignment manager further is configured to select an instance of the service by selecting an instance of the service having a highest service selection grade.

16. The apparatus of claim 14, wherein the service instance assignment manager further is configured to determine a service selection grade for each instance of the service by:
- determining an environmental information grade for the instance of the service based on the environmental information associated with the mobile device hosting the instance of the service;
- determining a situational information grade for the instance of the service based on the situational information associated with the mobile device hosting the instance of the service; and
- determining a service selection grade for the instance of the service based on the environmental information grade and the situational information grade.

17. The apparatus of claim 16, wherein the service instance assignment manager further is configured to determine the environmental information grade for the instance of the service by adjusting the environmental information grade based on an environmental information parameter, and wherein the service instance assignment manager further is configured to determine the situational information grade for the instance of the service comprises adjusting the situational information grade based on a situational information parameter.

18. The apparatus of claim 16, wherein the service instance assignment manager further is configured to, for one or more instances of the service of the plurality of instances of the service:
- perform one or more of:
  - comparing the environmental information grade for the instance of the service to an environmental information grade threshold;
  - comparing the situational information grade for the instance of the service to a situational information grade threshold; and
- based on the comparison of the environmental information grade to the environmental information grade threshold or the situational information grade to the situational information grade threshold, determine that the instance of the service is unavailable for use by the mobile device.

19. The apparatus of claim 11, wherein the apparatus is a mobile device.

20. The apparatus of claim 11, wherein the apparatus is a server.

* * * * *